May 20, 1958  L. P. PERESENYI  2,835,036
FOOTBALL YARDAGE TELESCOPE
Filed Oct. 3, 1955
2 Sheets-Sheet 1
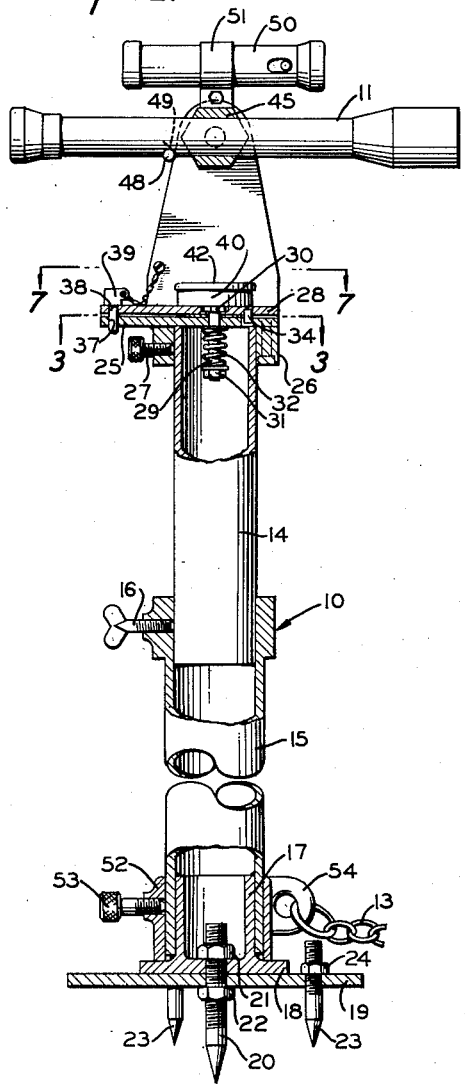
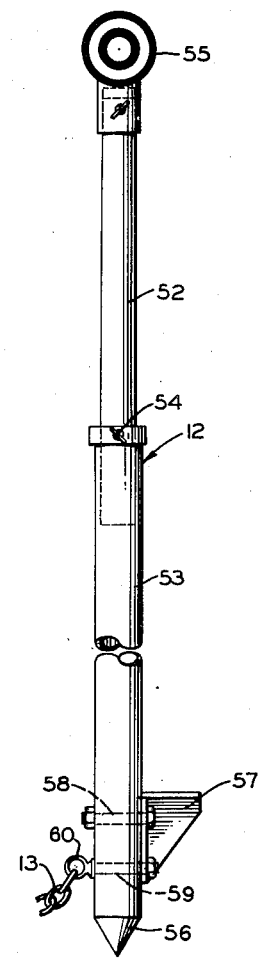
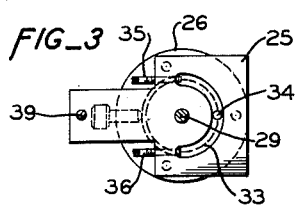
INVENTOR.
LOUIS P. PERESENYI
BY
ATTORNEYS May 20, 1958  L. P. PERESENYI  2,835,036
FOOTBALL YARDAGE TELESCOPE
Filed Oct. 3, 1955  2 Sheets-Sheet 2
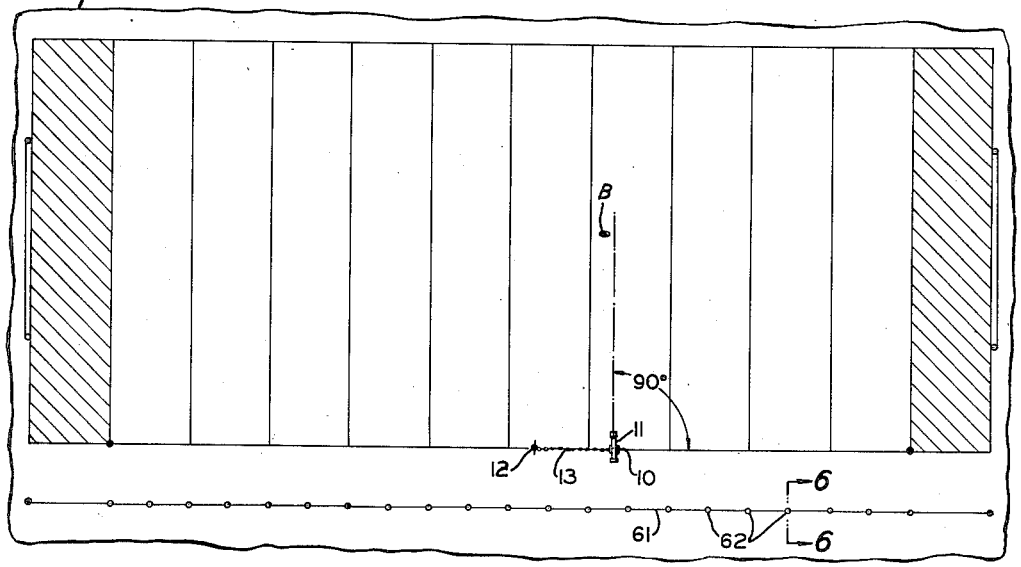
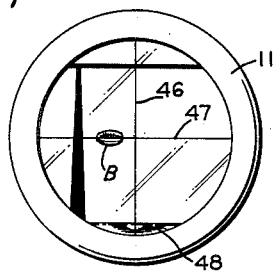
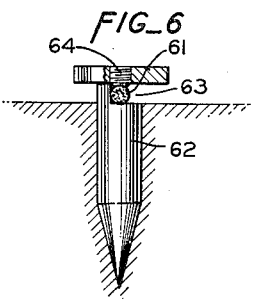
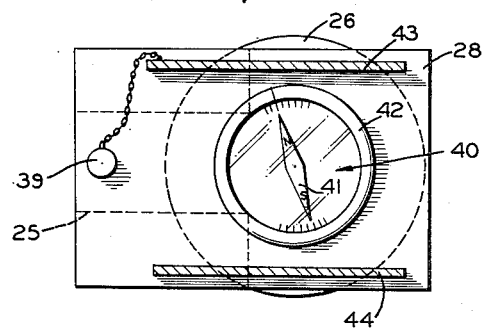
INVENTOR.
LOUIS P. PERESENYI
BY
ATTORNEYS ns patented May 20, 1958

2,835,036

FOOTBALL YARDAGE TELESCOPE

Louis P. Peresenyi, Concord, Calif.

Application October 3, 1955, Serial No. 538,147

5 Claims. (Cl. 33—46)

This invention relates to a telescope for use in determining the position of a football longitudinally of a playing field with reference to a previous position of the ball on the field.

As is commonly known, the present method of determining the position of a ball is by means of a chain which for close decisions must be carried out to the location of the ball and referred to the nearest yardage line. This method of determining whether the required yardage has been attained depends upon the accuracy of the yardage line. In many cases, the yardage lines as laid down on the field are not absolutely straight or sometimes become partially obliterated during the course of the game, particularly in inclement weather, resulting in an injustice to one team or the other in the measurement of the yardage.

It is the principal object of this invention to provide a telescope so arranged and mounted that it may be accurately positioned relative to one of the side lines of the field at any selected point on said side line, and sighted across the field at right angles to said side line to determine the position of the ball longitudinally of the field with reference to the line of sight, and therefore with reference to the preselected point on said side line.

A further object of the invention is to provide a telescope in accordance with the preceding object wherein the telescope may be swung through a horizontal arc of 180° and sighted in opposite directions along said side line and then locked in the position halfway between the diametrically opposed side line sights at right angles to said side line.

Still another object of the invention is to provide a telescope according to any of the preceding objects provided with a target which is plainly visible to the officials on the field.

A preferred form of the invention is described in the following detailed specification, and illustrated in the accompanying drawings, wherein:

Fig. 1 is a side elevation of a telescope structure embodying the principles of my invention.

Fig. 2 is a front elevation of a standard used at the opposite end of the chain.

Fig. 3 is a sectional view taken on line 3—3 of Fig. 1.

Fig. 4 is a plan view of a football playing field illustrating the use of the invention.

Fig. 5 is a view through the telescope showing the spirit level visible therein, and the cross hairs for determining the position of the ball.

Fig. 6 is a detail of the stakes used for holding wire side lines in place.

Fig. 7 is a horizontal section taken on the line 7—7 of Fig. 1.

Referring now to the drawings wherein similar reference numerals are used to denote the same elements throughout the various views shown, 10 indicates generally a standard adapted to support a telescope 11 and to be connected to a second standard 12 by a chain 13. The chain is of such length that the axes of the standards are exactly ten yards apart when the chain is taut.

The standard 10 is composed of an upper tubular member 14 telescopically received within the upper end of a lower tubular member 15. The standard may be adjusted to various lengths and locked by a set screw 16. The lower end of the lower standard member 15 is fixed to a tubular nipple 17 having a flat external circular end plate 18 formed integral therewith. A circular plate 19 is fastened adjacent the lower surface of the end plate 18 by a central downwardly projecting spear point 20 which extends through holes drilled in the center of each plate, and threadedly receives nuts 21 and 22, one above the end plate 18 and the other below the plate 19. Three other downwardly projecting spear points 23 (only two of which are shown) are threaded into suitable apertures spaced circumferentially 120° apart around the plate 19 and locked by jam nuts 24.

A base plate 25 is mounted on a depending tubular flange 26 which is rotatably received over the upper end of the upper standard member 14. A set screw 27 is threaded into a suitable aperture in the tubular flange 26 and abuts against the outer surface of the standard member 14. A swivel plate 28 rests on the upper surface of the base plate 25 and is arranged to swivel relative to said base plate about a pivot pin 29 extending through both plates coaxial with the standard 10. The upper end of the pin 29 is provided with a head 30, recessed into the upper surface of the plate 28, and the lower end is threaded to receive a nut 31. A spring 32 is confined between the nut 31 and the lower surface of the base plate 25. The base plate 25 is provided with an arcuate slot 33 concentric with the pin 29, and the swivel plate 28 is provided with a downwardly extending pin 34 received within said slot.

Two adjusting screws 35 and 36 are threaded into the plate 25 in such manner that their forward ends are adjacent the ends of the slot 33 and are adapted to be contacted by the pin 34 to limit the swivel movement of the upper plate 28. The adjustment screws 35 and 36 are adjusted to limit such swivel movement to exactly 180°. A hole 37 is provided in the base plate 25 and a second hole 38 in the swivel plate 28. The holes 37 and 38 are adapted to be in registration by a removable pin 39 when the swivel plate is exactly at the midpoint of its permissible movement, namely, at 90° to either of its extreme positions.

A compass 40 having a needle 41, is mounted on the upper surface of the swivel plate 28 coaxial with the standard 10. The compass 40 is provided with a collar 42 rotatably mounted on the compass case. The collar 42 has a single radial indicating mark inscribed on its upper surface.

Two brackets 43 and 44 are mounted on the swivel plate 28 and extend upwardly therefrom. The telescope 11 is mounted between the upper ends of the brackets 43 and 44 by a bar extending between said brackets and rotatably received therein.

As seen in Fig. 5, the telescope is provided with the usual cross hairs 46 and 47 for sighting on the football B. Mounted within the telescope 11 is a spirit level 48 and a mirror 49 mounted at 45° to permit reading of the level 48 while sighting through the telescope. A flashlight 50 is mounted above the telescope 11 by a suitable bracket 51 to permit the officials on the field to accurately locate the device at night.

A collar 52 rotatably surrounds the lower end of the standard 10 and is adapted to be fixed in any angular position relative thereto by a set screw 53. An eye 54 is attached to or formed integral with the collar 52 and one end of the chain 13 is fixed to the collar, The second standard 12 is composed of an upper member 52 telescopically received in the upper end of a lower member 53 and adjustably locked with respect thereto by a thumb screw 54. A target 55 is fixed to the upper end of the standard 12 to facilitate location thereof by the officials on the field. The lower end of the standard 12 is pointed as shown at 56 to permit insertion thereof into the ground. A foot step 57 is fixed adjacent the lower end of the standard 12 by two bolts 58 and 59. The lowermost bolt 59 is formed with an eye 60 at its head. The opposite end of the chain 13 is attached to the eye 60.

In the use of the device, the standard 10 is inserted into the ground at any convenient point on the side line and the pin 39 is removed from the holes 37 and 38. The telescope 11 is swung laterally until it reaches one of the stop screws 35 or 36 and sighted on the flag at corner intersection of the goal line and the side line. The base plate 25 is locked in position at this point by the set screw 27. The telescope 11 is then swiveled until the pin 34 reaches the other stop screw 35 or 36 and sighted on the intersection of the opposite end of the goal line and the other goal line to check for accurate alignment. Of course, on each sighting the spirit level 48 must be observed to insure that the standard 10 is not inclined laterally. The swivel plate 28 and telescope 11 are then moved to their mid-position and locked therein by inserting the pin 39 into the matching holes 37 and 38. The collar 42 on the compass 40 is then adjusted so that the index mark thereon is opposite the north end of the compass needle 41. All of the above operations are carried out prior to the start of the game in order to properly orient the device relative to the playing field.

When play is commenced, the standard 12 is inserted into the ground at the side line at a position even with the front edge of the ball when considered in the direction in which the team having possession of the ball is attempting to advance. The chain 13 is stretched taut and the standard 10 is inserted in the ground ten yards in advance of the standard 12, all of which operations are currently used with the chaining operation currently used in football games. When the standard 10 is in place the thumbscrew 27 is loosened and the base plate 25 is oriented relative to the standard 10 until the north end of the compass needle 41 is opposite the indicating mark on the collar 42 and the thumbscrew 27 is then locked. When it is desired to determine if the necessary yardage for a first down has been made, it is not necessary for the chain to be carried out onto the playing field; the head linesman merely sights through the telescope 11, making sure the spirit level 48 is centered, to see if the ball has reached the vertical cross hair.

If it is desired to check the accuracy of the setting of the device, it is merely necessary to remove the pin 39 and rotate the plate 28 through 90° until the pin 34 reaches one of the stops 35 or 36 and sight on the intersection of the side line and the goal line.

If the weather is inclement, and there is a chance that portions of the side line may become obliterated, a wire 61 of stainless steel or similar material is stretched along the side of the field parallel to the side line in the manner shown in Fig. 4. The wire 61 is held in place by a plurality of stakes 62 placed at five-yard intervals therealong. The wire 61 is received in a lateral slot 63 beneath the head of each of the stakes 62 and held therein by a set screw 64 threaded into the top of the stake.

While I have shown and described the preferred form of my invention, it is to be understood that various changes may be made in this construction by those skilled in the art without departing from the spirit of the invention as defined in the appended claims.

I claim:

1. A football yardage measuring telescope comprising: a telescoping supporting column; means for locking said column in adjusted lengths; a platform rotatably mounted on the upper end of said column, means for locking said platform relative to said column; a telescope mounting swivelly mounted on said platform coaxially with said column, adjustable means for limiting the swivel movement of said mounting to exactly 180°; means for locking said mounting at the mid-point of its permissible travel 90° from each end thereof; a telescope mounted in said mounting for swivel movement about an axis parallel to said platform; a spirit level in said telescope mounted transversely to the axis thereof; and a mirror mounted within said telescope at 45° to the axis thereof above said spirit level to permit the reading of said spirit level while sighting through said telescope.

2. A football yardage-measuring telescope comprising: a telescope supporting column; means for locking said column in adjusted lengths; a platform rotatably mounted on the upper end of said column; means for locking said platform relative to said column; a telescope mounting swivelly mounted on said platform coaxial with said column, adjustable means for limiting the swivel movement of said mounting to exactly 180°; means for locking said mounting at the mid-point of its permissible travel 90° from each end thereof; a telescope mounted in said mounting for swivel movement about an axis parallel to said platform; a spirit level in said telescope mounted transversely to the axis thereof; a mirror mounted within said telescope at 45° to the axis thereof above said spirit level to permit the reading of said spirit level while sighting through said telescope; and a vertical cross hair in said telescope.

3. A football yardage-measuring telescope comprising: a telescoping supporting column; means for locking said column in adjusted lengths; a platform rotatably mounted on the upper end of said column; means for locking said platform relative to said column; a telescope mounting swivelly mounted on said platform coaxial with said column; adjustable means for limiting the swivel movement of said mounting to exactly 180°; means for locking said mounting at the mid-point of its permissible travel 90° from each end thereof; a telescope mounted in said mounting for swivel movement about an axis parallel to said platform; a spirit level in said telescope mounted transversely to the axis thereof; a mirror mounted within said telescope at 45° to the axis thereof above said spirit level to permit the reading of said spirit level while sighting through said telescope; a vertical cross hair in said telescope; and means rotatably connected to said column adjacent the lower end thereof adapted to be connected to one end of a measuring chain.

4. A football yardage-measuring telescope comprising: a telescoping supporting column; means for locking said column in adjusted lengths; a platform rotatably mounted on the upper end of said column; means for locking said platform relative to said column; a telescope mounting swivelly mounted on said platform coaxially with said column; adjustable means for limiting the swivel movement of said mounting to exactly 180°; means for locking said mounting at the mid-point of its permissible travel 90° from each end thereof; a telescope mounted in said mounting for swivel movement about an axis parallel to said platform; a spirit level in said telescope mounted transversely to the axis thereof; a mirror mounted within said telescope at 45° to the axis thereof above said spirit level to permit the reading of said spirit level while sighting through said telescope; a vertical cross hair in said telescope; means rotatably connected to said column adjacent the lower end thereof adapted to be connected to one end of a measuring chain; and means on the lower end of said column adapted to be forced into the ground to support said column.

5. A football yardage-measuring telescope comprising: a telescoping supporting column; means for locking said column in adjusted lengths; a platform rotatably mounted on the upper end of said column; means for locking said platform relative to said column; a telescope mounting swivelly mounted on said platform coaxial with said column; adjustable means for limiting the swivel movement of said mounting to exactly 180°; means for locking said mounting at the mid-point of its permissible travel 90° from each end thereof; a compass fixedly mounted on said telescope mounting coaxial with said column; an adjustable collar rotatably mounted on said compass and having radial indicating mark thereon; a telescope mounted in said mounting for swivel movement about an axis parallel to said platform; a spirit level in said telescope mounted transversely to the axis thereof; a mirror mounted within said telescope at 45° to the axis thereof above said spirit level to permit the reading of said spirit level while sighting through said telescope; a vertical cross hair in said telescope; means rotatably connected to said column adjacent the lower end thereof adapted to be connected to one end of a measuring chain; and means on the lower end of said column adapted to be forced into the ground to support said column.

References Cited in the file of this patent

UNITED STATES PATENTS

| | | |
|---|---|---|
| 297,164 | Randolph | Apr. 22, 1884 |
| 470,076 | Randolph | Mar. 1, 1892 |
| 487,473 | Crosby | Dec. 6, 1892 |
| 702,354 | Beal | June 10, 1902 |
| 1,010,339 | Angel | Nov. 28, 1911 |
| 2,060,165 | Borleske | Nov. 10, 1936 |
| 2,137,776 | Leupold | Nov. 22, 1938 |
| 2,335,066 | Lamar | Nov. 23, 1943 |
| 2,690,015 | Edwards | Sept. 28, 1954 |